US012673429B2

(12) United States Patent
Zhang et al.

(10) Patent No.: US 12,673,429 B2
(45) Date of Patent: Jul. 7, 2026

(54) HIGH-THROUGHPUT METHOD FOR PREPARING ANTICORROSION COATINGS

(71) Applicant: University of Science and Technology Beijing, Beijing (CN)

(72) Inventors: Dawei Zhang, Beijing (CN); Xiangping Hao, Beijing (CN); Yixin Qian, Beijing (CN); Lingwei Ma, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 19/260,279

(22) Filed: Jul. 4, 2025

(65) Prior Publication Data

US 2026/0175438 A1 Jun. 25, 2026

(30) Foreign Application Priority Data

Dec. 19, 2024 (CN) .......................... 202411874371.2

(51) Int. Cl.
| | |
|---|---|
| *B25J 11/00* | (2006.01) |
| *B05D 1/02* | (2006.01) |
| *B05D 1/28* | (2006.01) |
| *B05D 3/06* | (2006.01) |
| *B25J 9/16* | (2006.01) |

(52) U.S. Cl.
CPC ............. *B25J 11/0075* (2013.01); *B05D 1/02* (2013.01); *B05D 1/28* (2013.01); *B05D 3/067* (2013.01); *B25J 9/1697* (2013.01); *B05D 2350/35* (2013.01)

(58) Field of Classification Search
CPC . B05D 1/02; B05D 1/28; B05D 3/067; B05D 2350/35; B25J 11/0075; B25J 9/1697
See application file for complete search history.

(56) References Cited

U.S. PATENT DOCUMENTS

| | | | | |
|---|---|---|---|---|
| 2004/0062873 A1* | 4/2004 | Jung | ........................ | C09D 7/48 427/407.1 |
| 2012/0128933 A1* | 5/2012 | Yeh | ........................ | B82Y 40/00 427/595 |
| 2012/0217607 A1* | 8/2012 | Hanai | ................... | H10F 39/804 438/66 |
| 2013/0287537 A1* | 10/2013 | Hecht | ...................... | B65G 1/04 414/788.4 |
| 2017/0141362 A1* | 5/2017 | Ijuin | ...................... | H01G 11/78 |

FOREIGN PATENT DOCUMENTS

| | | | | |
|---|---|---|---|---|
| CA | 2426081 | * | 2/2012 | ............... C09D 5/08 |
| CN | 167803 | * | 9/2005 | ............... C09D 5/08 |
| CN | 117007388 A | | 11/2023 | |
| CN | 119104743 A | | 12/2024 | |
| JP | 2010-126801 | * | 6/2010 | ............. C23C 14/14 |
| JP | 2011-207579 | * | 10/2011 | ............. B65H 27/00 |
| WO | 0132320 A1 | | 5/2001 | |
| WO | WO 2014/137352 | * | 9/2014 | ............... C09D 5/08 |

OTHER PUBLICATIONS

Deng, Shu-hao, et al., "Influence of UV light irradiation on the corrosion behavior of electrodeposited Ni and Cu nanocrystalline foils". Scientific Reports (2020) 10:3049, pp.*

Radwan, A. Bahgat, et al., "Anticorrosion Properties of Robust and UV-Durable Poly(vinylidene fluoride-co-hexafluoropropylene)/ Carbon Nanotubes SuperhydrophobicCoating". Ind. Eng. Chem. Res. 2024, 63, 1380-1395.*

Wang, Youzhi, et al., "UV-irradiation assisted corrosion protective oxides film on pure Sn solder substrate exposed to atmospheric environment". Materials Today Communications 35 (2023) 105997, pp. 1-5.*

* cited by examiner

*Primary Examiner* — Bret P Chen

(57) ABSTRACT

A high-throughput method for preparing anticorrosion coatings, includes the steps of: treating surfaces of sample substrates to be coated by removing oxide layers, and placing the treated substrates on specimen fixture trays; determining solution data based on types and composition ranges of corrosion inhibitors planned for anticorrosion coating preparation; preparing solutions based on the solution data, adding the solutions to designated test tubes, and thoroughly mixing with primer coats to obtain coating solutions; dispensing the formulated coating solutions onto the surfaces of the sample substrates to be coated using a pipette, and applying coatings using a coating application robotic arm in a high-throughput anticorrosion coating preparation platform; transferring the applied sample substrates to an ultraviolet (UV) radiation station, and performing irradiation to achieve thermal curing; and transferring the entire specimen fixture tray to a designated position using a gantry robotic arm.

8 Claims, 5 Drawing Sheets

41

42

HIGH-THROUGHPUT METHOD FOR PREPARING ANTICORROSION COATINGS

CROSS-REFERENCE TO RELATED APPLICATION

This application claims priority of Chinese Patent Application No. 202411874371.2, filed on Dec. 19, 2024, the entire contents of which are incorporated herein by reference.

TECHNICAL FIELD

The present application relates to the technical field of anticorrosion coating preparation, and specifically to a high-throughput method for preparing anticorrosion coatings.

BACKGROUND

An anticorrosion coating refers to a protective layer applied onto a metallic surface to isolate it from surrounding media, thereby controlling corrosion of metal materials. Contemporary coatings for corrosion control are primarily classified into sacrificial coatings, inhibitive coatings, conductive coatings, and barrier coatings, among others.

The inhibitive coatings primarily achieve corrosion protection through formulations compounded by blending one or multiple corrosion inhibitors with primer coats. However, these conventional anticorrosion coatings exhibit monofunctional properties. Given diverse corrosive factors across varied environments and each presenting distinct characteristics, current coatings fail to simultaneously address corrosion challenges under different environmental conditions.

Moreover, existing research demonstrates that multiple parameters, including the concentration, type, and formulation ratios of corrosion inhibitors, significantly influence the polymerization state and performance of anticorrosion coatings. Screening such diverse variables and potential corrosion inhibitor combinations for different service environments is extremely time-consuming, labor-intensive, and resource-heavy. Conventional technologies primarily rely on manual methods involving ratio-by-ratio screening, compounded formulation synthesis, and performance evaluation, posing significant challenges to the development of anticorrosion coatings.

Although existing patents indicate partial adoption of automated coating preparation devices or robots in domestic and overseas laboratories, the robots exhibit critically limited robotic mobility/perception capabilities, monotonous motion patterns, unreliable operation, and poor adaptability, making it difficult to achieve high-precision control and multitask coordination required for complex multi-scenario material experiment task, thereby failing to rapidly customize the selection of corrosion inhibitor types, formulation of additive ratios, and performance characterization based on corrosion conditions in different environments.

The conventional technologies exhibit inadequate design exploration capabilities for coating raw materials, preparation processes, and structural architectures, failing to rapidly identify optimal structures of corrosion inhibitors within coatings, thereby constraining research and development efficiency in advanced anticorrosion coating materials. During coating preparation, due to varying viscosity and fluidity properties of corrosion inhibitor formulations, conventional automated preparation devices cannot intelligently select preparation methods based on material fluidity and viscosity, imposing stringent requirements on the surface tension of coating substrates, thereby limiting device applicability.

SUMMARY

An objective of the present application is to provide a high-throughput method for preparing anticorrosion coatings to solve the technical problem that conventional technologies cannot rapidly and accurately select corrosion inhibitor types or formulations of different inhibitors to meet specific performance requirements of anticorrosive coatings, achieving cost-effective high-throughput production of anticorrosion coatings with formulated corrosion inhibitors. In this method, a robot is integrated, which incorporates a vision-based monitoring and recognition system capable of intelligently selecting application methods based on solution fluidity and viscosity, or alternatively performing substrate modification treatments to facilitate roller coating preparation, thereby significantly expanding the applied range.

To realize the above objective, the present disclosure provides a high-throughput method for preparing anticorrosion coatings, including the steps of:

treating surfaces of sample substrates to be coated by removing oxide layers, and placing the treated substrates on specimen fixture trays;

determining solution data based on types and composition ranges of corrosion inhibitors planned for anticorrosion coating preparation;

preparing solutions based on the solution data, adding the solutions to designated test tubes using a high-throughput anticorrosion coating preparation platform, and thoroughly mixing with primer coats to obtain coating solutions;

dispensing the formulated coating solutions onto the surfaces of the sample substrates to be coated using a pipette, and applying coatings using a coating application robotic arm integrated in the high-throughput anticorrosion coating preparation platform;

transferring the coated sample substrates to an ultraviolet (UV) radiation station, and performing irradiation by selecting different wavelengths and times corresponding to specific liquids to achieve thermal curing of the anticorrosion coatings; and removing the specimen fixture tray from the UV radiation station upon completion of irradiation, and transferring the entire specimen fixture tray to a designated position using a gantry robotic arm, finalizing the preparation of the anticorrosion coatings.

The high-throughput anticorrosion coating preparation platform includes a stock solution bottle loading assembly, a robot motion assembly, a roll-coating gantry assembly, and a control assembly, in which:

the robot motion assembly includes a liquid handling robotic arm, a roll-coating robotic arm, an uncapping robotic arm, and a robotic vision monitoring system;

the robotic vision monitoring system can determine the necessity of ion spraying surface treatment operations based on assessment of coating spreading behaviors across the surfaces of the sample substrates;

the liquid handling robotic arm includes a clamp hand assembly, pipettes, a pipette tip rack, and a vortex mixer, and the pipette includes a single-row pipette configuration capable of simultaneously aspirating distinct solutions; or alternatively, allowing independent aspiration of distinct solutions or identical solutions through peripheral channels within the single-row pipette; and the roll-coating robotic arm can determine a coating application method from roller coating, drop coating, or spray coating under the control of the robotic vision monitoring system and the control assembly, based on solution fluidity characteristics;

In an alternative implementation, the control assembly is electrically connected to the robot motion assembly and the robotic vision monitoring system.

In an alternative implementation, the stock solution bottle loading assembly includes a stock solution bottle gantry, a stock solution bottle electric gripper, a floating mechanism, a solution bottle tray, a locating block, a drag chain, and a clamping mechanism, an induction sensor is arranged at a lower portion of the solution bottle tray, photoelectric switches are correspondingly arranged on the stock solution bottle gantry, and the induction sensor and the photoelectric switches are electrically connected to the control assembly.

In an alternative implementation, upon manual placement of stock solution bottles onto the solution bottle tray, the placement of stock solution bottles is detected by the induction sensor, and each stock solution bottle is grasped by the stock solution bottle gantry and transferred to the clamping mechanism where it is clamped; after clamping, a bottle cap is rotated open by the stock solution bottle electric gripper, the bottle cap is retracted to standby position through the stock solution bottle gantry, and a liquid aspiration signal is issued from the control assembly to the robot motion assembly for liquid aspiration; and upon completion, a signal is returned to the control assembly from the robot motion assembly, the bottle cap is re-tightened through the stock solution bottle gantry, and the stock solution bottle is released by the clamping mechanism and returned to its initial position.

In an alternative implementation, the clamp hand assembly, the pipette, the vortex mixer and the roll-coating gantry assembly are electrically connected to the control assembly.

In an alternative implementation, upon manual placement of pipette tips onto the pipette tip rack, the pipette tips are clamped by the clamp hand assembly for liquid aspiration using the pipette; and after liquid aspiration, the liquid handling robotic arm moves to the vortex mixer, and liquid dispensing is executed by the pipette into the test tubes, followed by the vortex mixer performing a shaking operation; and upon the completion of the shaking operation, the clamp hand assembly of the liquid handling robotic arm drives the pipette for liquid aspiration, while the roll-coating gantry assembly clamps the tray and places it on the roll-coating station; and upon completion of placement, the liquid handling robotic arm controls the pipette to perform quantitative dispensing operations, and contaminated tips are discarded after all reagents have been dispensed.

In an alternative implementation, the roll-coating gantry assembly includes a roll-coating gantry, a roll-coating electric gripper, a hollow rotating platform, a laser displacement sensor, a camera, roll-coating trays, a roller rack, and UV curing assemblies, and the roll-coating gantry, the laser displacement sensor, the camera and the roll-coating electric gripper are electrically connected to the control assembly.

In an alternative implementation, manual placement of roll-coating trays and rollers at fixed positions is performed, followed by moving the roll-coating gantry above a target tray; each roll-coating tray position is determined using the laser displacement sensor, and quick response (QR) code scanning is performed by the camera to register the roll-coating tray; after reagent dispensing by the liquid handling robotic arm, the roller is clamped by the roll-coating gantry; the presence of rollers at a roll-coating station is determined using sensors, and roller coating is performed following roller clamping by the roll-coating electric gripper; and upon completion, the rollers are transferred to an unloading station.

In an alternative implementation, the unloading station is arranged at a lower portion of the roller rack, through-beam sensors are arranged on the unloading station, and the through-beam sensors are electrically connected to the control assembly;

upon detection of the roller placed at the unloading station by the through-beam sensors, the roll-coating gantry is retracted to its initial position while the roll-coating tray is advanced into the UV curing assembly for irradiation; and after a predetermined irradiation time elapses, the roll-coating tray is ejected while the roll-coating tray is clamped by the roll-coating electric gripper, and the position of the roll-coating tray is determined by the laser displacement sensor, finalizing the unloading operation; and the UV curing assembly includes a UV lamp, and the UV lamp is electrically connected to the control assembly.

In an alternative implementation, the preparation platform further includes a high-throughput spraying mechanism, the high-throughput spraying mechanism includes a quantitative conveying mechanism, a disposable needle tube, a spray-head lifting mechanism, and an atomizing nozzle; and the robot motion assembly can drive the quantitative conveying mechanism to mount the disposable needle tube, and aspirate liquids for spray coating into the needle tube; and the liquid-filled disposable needle tube can be inserted into a spray-coating atomization zone of the spray-head lifting mechanism under driven by the robot motion assembly, and spray the liquids onto carrier surfaces in combination with the atomizing nozzle.

The present disclosure provides the high-throughput method for preparing anticorrosion coatings based on photocuring technology. Leveraging the high-throughput anticorrosion coating preparation platform, this method can rapidly and efficiently complete formulation of diverse coating components, process large-scale coating applications with varied anticorrosive formulations and subsequent transfer curing operations, achieving intelligent optimization of coating formulations and experimental protocols/workflows, thereby resolving the problems inherent in conventional coating preparation processes. Specifically, it addresses the complexities associated with optimizing intricate coating formulation systems containing resins, curing agents, fillers, and other components, while overcoming limitations related to lengthy sample preparation cycles and difficulty in identifying optimal formulations. Furthermore, the intelligent robot is integrated, which has multi-task coordination capabilities, rapid switching between multiple processes, and obstacle avoidance in confined spaces during material preparation experiments, facilitating remote operation and real-time monitoring of experimental procedures, resulting in substantial reductions in labor costs while achieving automated high-volume production and processing of coatings.

Additional features and advantages of the present application will be elaborated in the subsequent detailed description of embodiments.

BRIEF DESCRIPTION OF THE DRAWINGS

To more clearly illustrate the technical solutions in the embodiment of the present application, a brief description of the drawings required to be used in the embodiment is presented below. It is to be understood that the drawings described below are only certain embodiments of the present application and shall not be regarded as limiting the scope. For those ordinary skilled in the art, other related drawings may be obtained based on these drawings without creative efforts.

Figure 1:
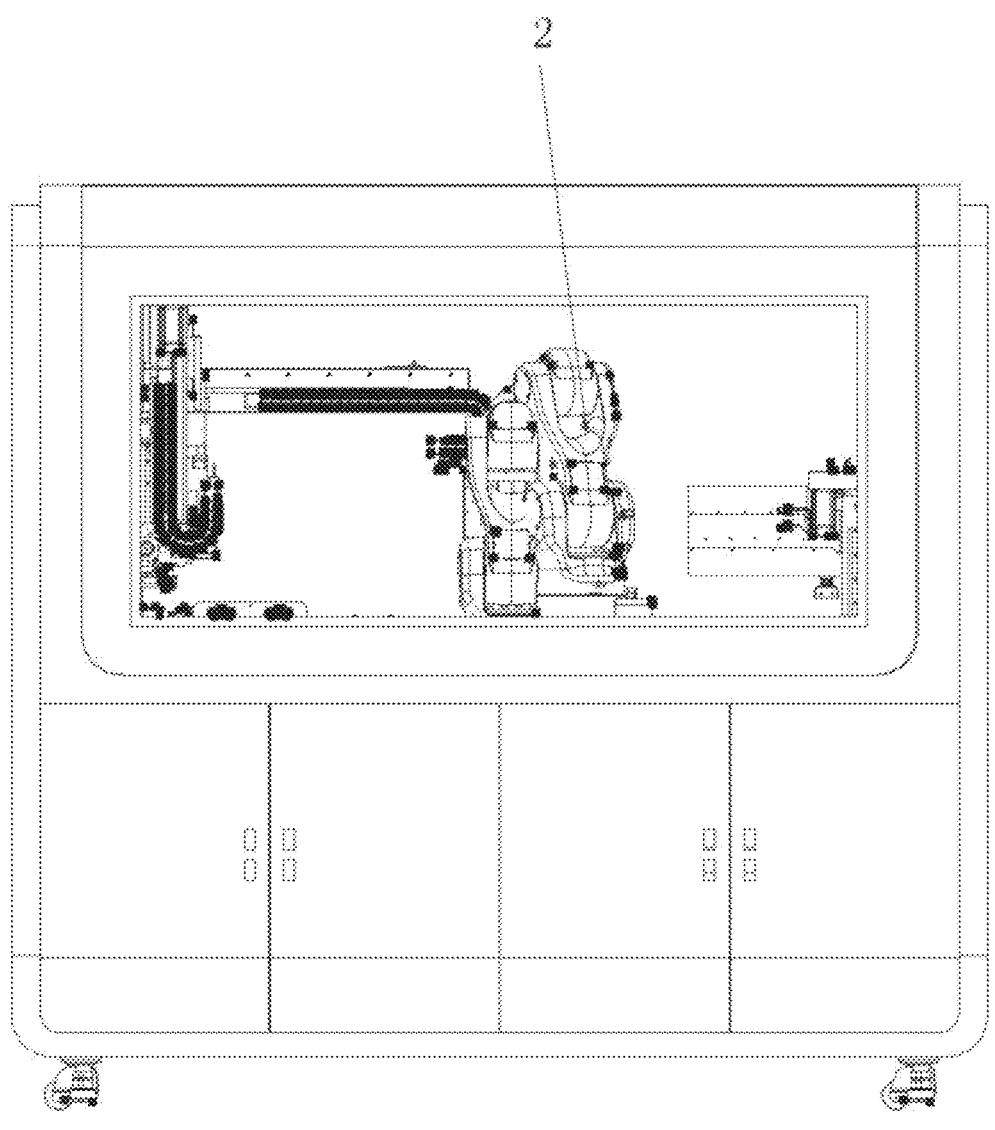
FIG. 1 is a schematic structural diagram of a high-throughput anticorrosion coating preparation platform according to the present application.
Figure 2:
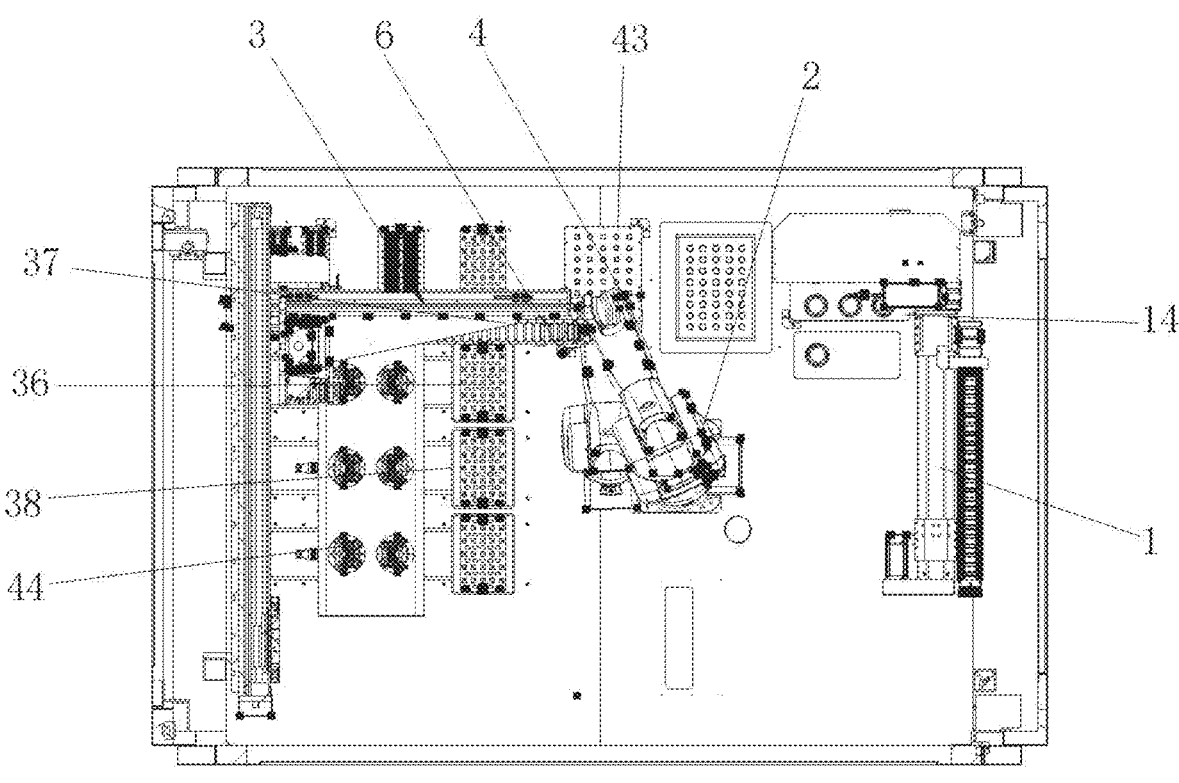
FIG. 2 is a schematic top view of FIG. 1.
Figure 3:
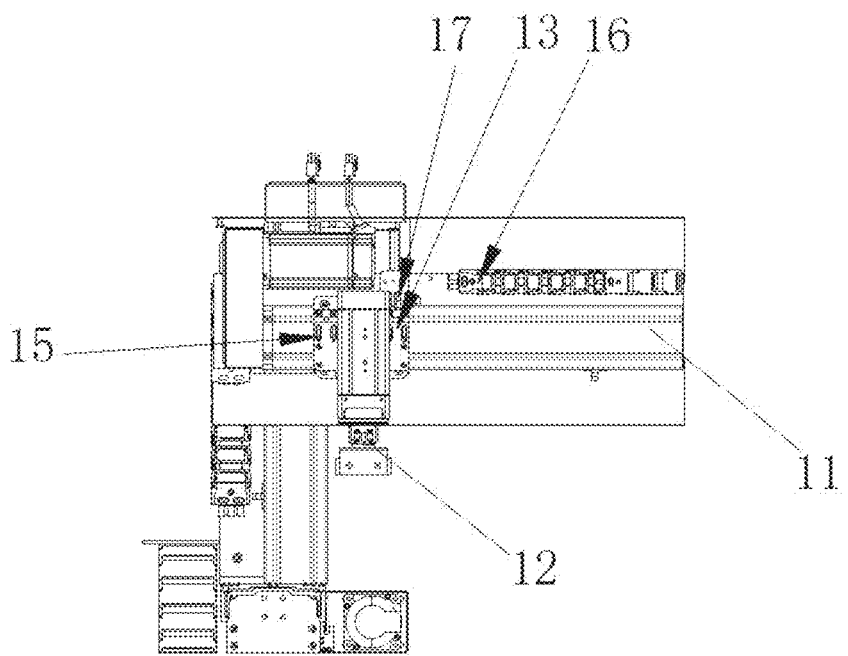
FIG. 3 is a schematic structural diagram of a stock solution bottle loading assembly.
Figure 4:
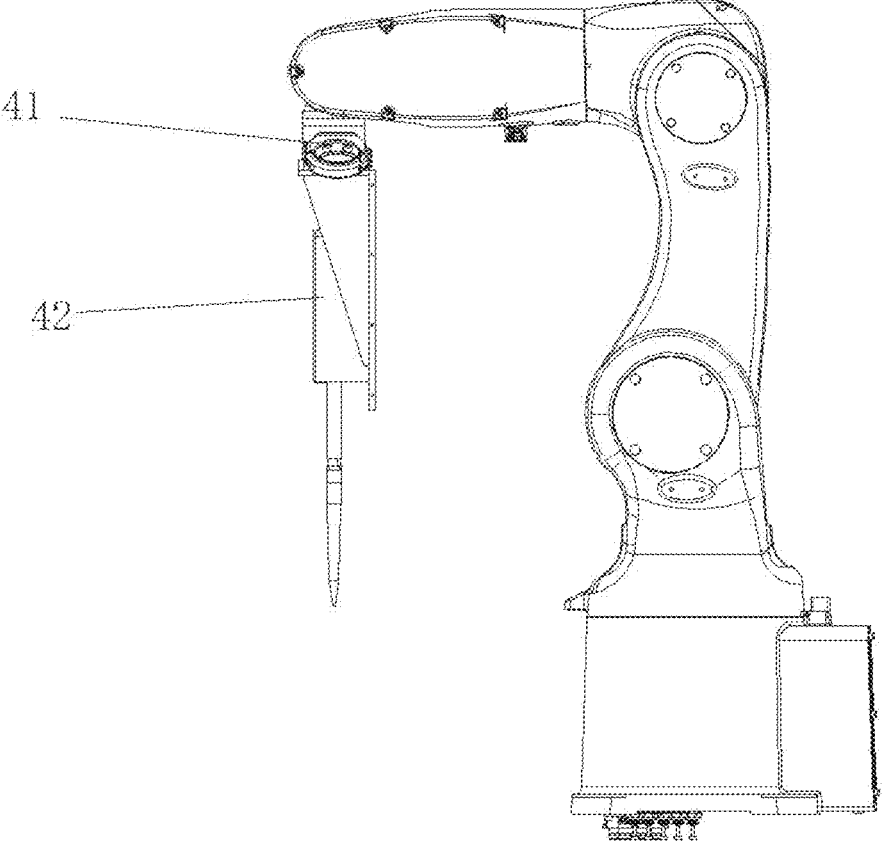
FIG. 4 is a schematic structural diagram of a liquid handling robotic arm.
Figure 5:
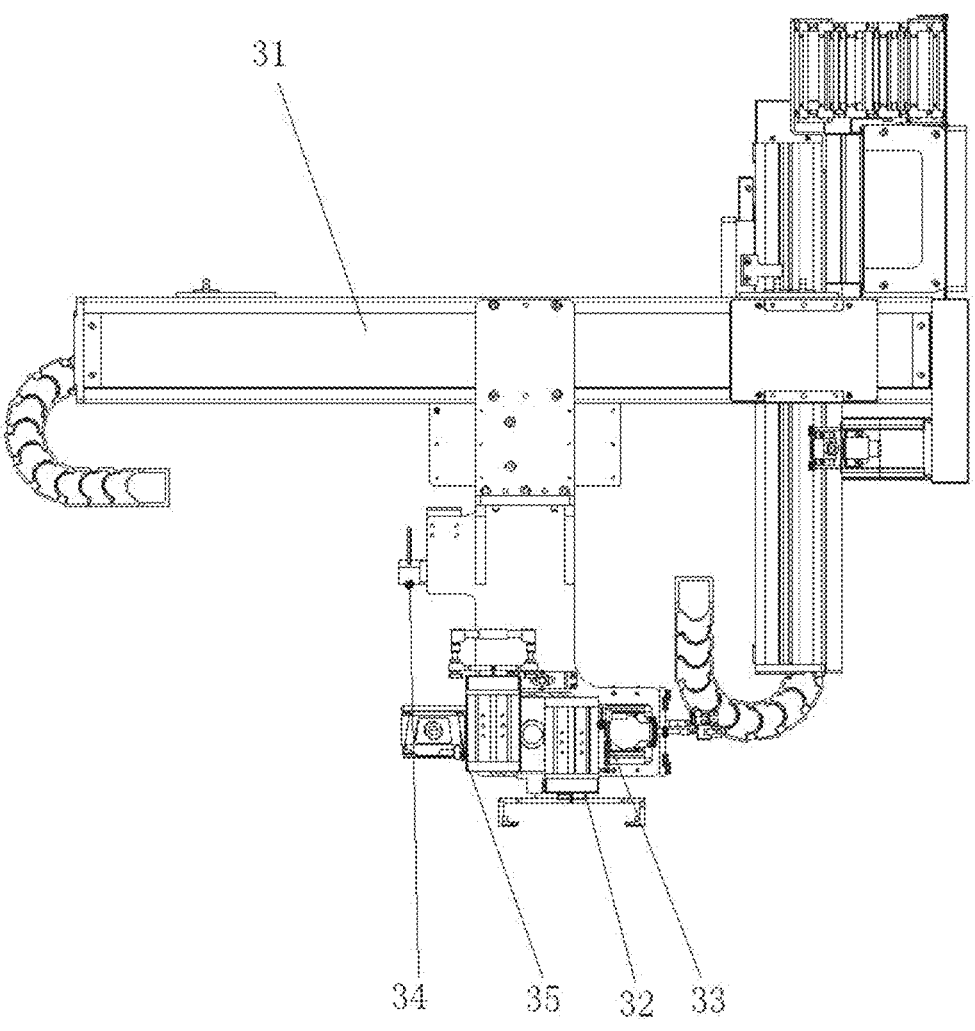
FIG. 5 is a schematic structural diagram of a roll-coating robotic arm.

Reference numerals and denotations thereof:

1—stock solution bottle loading assembly; 11—stock solution bottle gantry; 12—stock solution bottle electric gripper; 13—floating mechanism; 14—solution bottle tray; 15—locating block; 16—drag chain; and 17—clamping mechanism;

2—robot motion assembly;

3—roll-coating gantry assembly; 31—roll-coating gantry; 32—roll-coating electric gripper; 33—hollow rotating platform; 34—laser displacement sensor; 35—camera; 36—roll-coating tray; 37—roller rack; and 38—UV curing assembly;

4—liquid handling robotic arm; 41—clamp hand assembly; 42—pipette; 43—pipette tip rack; and 44—vortex mixer;

5—roll-coating robotic arm;

6—uncapping robotic arm; and

7—high-throughput spraying mechanism; 71—quantitative conveying mechanism; 72—disposable needle tube; 73—spray-head lifting mechanism; and 74—atomizing nozzle.

DETAILED DESCRIPTION

In order to make the purpose, technical solution and advantages of the embodiment of the present application more clear, the technical solution in the embodiment of the present application is further described clearly and completely below in combination with the accompanying drawings in the embodiment of the present application. Obviously, the embodiment described is only some, rather than all embodiments of the present application. Components of the embodiments depicted and described in the accompanying drawings herein may be arranged and designed in multiple configurations.

In the description of the present application, it is to be noted that the orientation or state relations indicated by the terms "inner", "outer", etc., are based on those shown in the accompanying drawings or the conventional placement of the product during use and merely for the ease of describing the present application and simplifying the description, rather than indicating or implying that the device or element referred to must be in a specific orientation or constructed and operated in a specific orientation, and therefore cannot be interpreted as limiting the present application. In addition, the terms "first" and "second" are only used f to distinguish descriptions, not to be understood as indicating or implying relative importance.

In the description of the present application, it is to be noted that unless otherwise clearly specified and limited, the terms "arranged" and "connection" are to be understood in a broad sense. For example, the connection can be fixed connection, detachable connection or integral connection; and it can further be direct connection, indirect connection through an intermediate medium, or connection between two components. For those of ordinary skilled in the art, the specific meanings of the above terms in the present application can be understood according to specific circumstances.

A high-throughput method for preparing anticorrosion coatings includes the steps that:

surfaces of sample substrates to be coated are treated by removing oxide layers, and the treated substrates are placed on specimen fixture trays;

solution data is determined based on types and composition ranges of corrosion inhibitors planned for anticorrosion coating preparation;

solutions are prepared based on the solution data, added to designated test tubes using a high-throughput anticorrosion coating preparation platform, and thoroughly mixed with primer coats to obtain coating solutions;

the formulated coating solutions are dispensed onto the surfaces of the sample substrates to be coated using a pipette, and the coatings are applied using a coating application robotic arm integrated in the high-throughput anticorrosion coating preparation platform;

the applied sample substrates are transferred to a UV radiation station, and irradiation is performed by selecting different wavelengths and times corresponding to specific liquids to achieve thermal curing of anticorrosion coatings; and upon completion of irradiation, the specimen fixture trays are removed from the UV radiation station, and the entire specimen fixture tray is transferred to a designated position using a gantry robotic arm, finalizing the preparation of the anticorrosion coatings.

Referring to FIG. 1 and in conjunction with FIGS. 2-5, the high-throughput anticorrosion coating preparation platform includes a stock solution bottle loading assembly 1, a robot motion assembly 2, a roll-coating gantry assembly 3, and a control assembly, in which:

the robot motion assembly 2 includes a liquid handling robotic arm 4, a roll-coating robotic arm 5, an uncapping robotic arm 6, and a robotic vision monitoring system, and the control assembly is electrically connected to the robot motion assembly 2 and the robotic vision monitoring system.

Specifically, the high-throughput anticorrosion coating preparation platform is a high-throughput anticorrosion coating material automated preparation integrated platform, in which the substrate plates are abrasively treated via sandpaper grinding to remove the oxide layers, and the treated substrates are placed within the specimen fixture trays. Based on coating spread behaviors observed on the sample surfaces, this device can autonomously determine necessity for plasma spray surface treatment to improve subsequent coating application effectiveness.

Furthermore, based on the corrosion inhibitor types and composition ranges designated for target anticorrosion coatings, a component-to-formulation solution volumetric ratio lookup table is determined for the coatings under development.

According to tabulated formulation data, the solutions corresponding to specified components are precisely formulated within test tubes of a test-tube setup. Utilizing the high-throughput anticorrosion coating material automated preparation integrated platform, the solutions are added into the designated test tubes and thoroughly mixed with the primer coats, and the formulated coating solutions are subsequently dispensed onto the surfaces of the sample substrates to be coated through the pipette 42. Leveraging the robotic vision monitoring system, surface tension of the substrates is modified based on viscosity and fluidity properties of different solutions, and fully automated coating application is performed by the coating application robotic arm integrated in the high-throughput anticorrosion coating material automated preparation integrated platform.

Subsequently, the applied sample substrates are transferred to the UV radiation station. Through the programming of the control assembly, the irradiation is performed by selecting different wavelengths and times on a touch screen corresponding to specific liquids to achieve thermal curing of the anticorrosion coatings. Upon completion of irradiation, the specimen fixture trays are removed from the UV radiation station, and the entire specimen fixture tray is transferred to the designated position using the gantry robotic arm, finalizing the preparation of the anticorrosion coatings.

The high-throughput anticorrosion coating material automated preparation integrated platform includes the stock solution bottle loading assembly 1, the robot motion assembly 2, the roll-coating gantry assembly 3, and the control assembly. It can achieve synchronized task coordination and rapid process transitions during coating preparation experiments, while supporting remote operation and real-time monitoring of the experimental process, thereby completing automated coating preparation.

The stock solution bottle loading assembly 1 includes a three-axis (X/Y/Z axes) stock solution bottle gantry 11, a stock solution bottle electric gripper 12, a floating mechanism 13 (including: a connecting plate, guide shafts and springs), a solution bottle tray 14, a locating block 15, a drag chain 16, and a clamping mechanism 17, an induction sensor is arranged at a lower portion of the solution bottle tray 14, photoelectric switches are correspondingly arranged on the stock solution bottle gantry 11, and the induction sensor and the photoelectric switches are electrically connected to the control assembly.

Upon manual placement of stock solution bottles onto the solution bottle tray 14, the placement of stock solution bottles is detected through the induction sensor, and each stock solution bottle is grasped by the stock solution bottle gantry 11 and transferred to the clamping mechanism 17 where it is clamped. After clamping, a bottle cap is rotated open by the stock solution bottle electric gripper 12, the bottle cap is retracted to a standby position through the stock solution bottle gantry 11, and a liquid aspiration signal is issued from the control assembly to the robot motion assembly 2 for liquid aspiration. Upon completion, a signal is returned to the control assembly from the robot motion assembly 2, the bottle cap is re-tightened through the stock solution bottle gantry 11, and the stock solution bottle is released by the clamping mechanism 17 and returned to its initial position. The number of turns for bottom cap engagement/disengagement are predefined within system programs during debugging stage, requiring no real-time feedback verification. Similarly, bottle clamping and release sequences are predefined within the system programs with fixed positions, motions, and operational cadence.

The liquid handling robotic arm 4 includes a clamp hand assembly 41, pipettes 42, a pipette tip rack 43, and a vortex mixer 44, and the clamp hand assembly 41, the pipette 42, the vortex mixer 44 and the roll-coating gantry assembly 3 are electrically connected to the control assembly.

Following manual placement of pipette tips into the pipette tip rack 43 (requiring full occupancy verification via human inspection), the stock solution gantry is started for bottle retrieval. Concurrently, bottle removal is detected through the corresponding sensor at its lower portion. At this time, a removal signal is transmitted from a programmable logic controller (PLC) of the control assembly to the robot, and the clamp hand assembly 41 is started to clamp the pipette tips. Following the clamping, a waiting state is maintained until the cap of the stock solution bottle is unscrewed, and the gantry is retracted to its standby position, with its arrival at the standby position confirmed by a photoelectric switch corresponding to gantry X axis. A signal is issued from the PLC to the robot, and the robot performs liquid aspiration flows. Upon arrival of the liquid handling robotic arm 4 at a target point position, a signal is transmitted to the PLC, executing precise liquid aspiration using the pipette 42. Upon reaching a predetermined volume threshold, a signal is transmitted from the pipette 42 to the PLC. Concurrently, the PLC concurrently issues a vortex-mixing signal to the robot system and a cap-sealing signal to the stock solution gantry, thereby causing the bottle to return to its initial position. When the robot reaches to the vortex mixer 44 position, a signal is transmitted from the robot to the PLC, and liquid dispensing is executed using the pipette 42 into the test tubes. Following completion of the dispensing operation, a signal is issued from the pipette 42 to the PLC. At this point, the robot moves to the pre-programmed standby position and sends a signal to the PLC, prompting the vortex mixer 44 to initiate the mixing process. The number of mixing cycles and frequency have been pre-configured in the system program. Upon completing the pre-set number of mixing cycles, the vortex mixer 44 halts the operation, and a signal is sent from the PLC to both the robot and the roll-coating gantry 31, prompting the robot to initiate liquid aspiration. When the robot reaches the liquid aspiration position, a signal is sent to the PLC, and liquid aspiration is subsequently executed using the pipette 42. Upon completion of liquid aspiration, a signal is transmitted from the pipette 42 to the PLC, performing subsequent actions through the robot, while executing the clamping and locating of roll-coating trays 36 at designated roll-coating locations through the roll-coating gantry 31. Upon completion of placement, the roll-coating gantry 31 is retracted to its standby position, with its arrival at the standby position confirmed by a photoelectric switch corresponding to the roll-coating gantry 31 axis, and a signal is transmitted to the robot to perform reagent solution dispensing. After the robot reaches the taught position, a signal is transmitted to the PLC, following which the pipette 42 is controlled to execute quantitative reagent dispensing. After the reagent has been dispensed, a signal is subsequently transmitted from the pipette 42, and the robot is guided to the next position. This operational cycle is continuously repeated until all reagent dispensing tasks have been fully accomplished. Upon completion of this flow, a signal is transmitted to the PLC by the robot, following which a waste chute is opened. The robot is subsequently guided to the designated position for waste pipette tip disposal, and another signal is sent to the PLC, triggering the ejection of the pipette tips by pipette gun 42. Following the ejection of the pipette tips, a signal is transmitted to the PLC. A delay of several seconds is implemented to ensure that the pipette tips are fully deposited into a waste bin, after which the robot is returned to its standby position.

The roll-coating gantry assembly 3 includes a three-axis (X/Y/Z axes) roll-coating gantry 31, a roll-coating electric gripper 32, a hollow rotating platform 33, a laser displacement sensor 34, a camera 35, the roll-coating trays 36, a roller rack 37, and UV curing assemblies 38, and the roll-coating gantry 31, the laser displacement sensor 34, the camera 35 and the roll-coating electric gripper 32 are electrically connected to the control assembly.

Manual placement of the roll-coating trays 36 and rollers at fixed positions is performed, followed by moving the roll-coating gantry 31 above a target tray, and distance measurement is initiated by the laser displacement sensor 34. Tray height is determined based on the measured height data, which is transmitted to the PLC for processing, thereby determining the tray position.

QR code scanning is performed using the camera 35 to register the roll-coating tray 36, and scanned information is transmitted to an iPad. After completion of information input, the roll-coating tray 36 is gripped by the gantry and placed into a roll-coating station, and reagent dispensing is performed using the liquid handling robotic arm 4 of the robot. After the robot finishes the action, the robot returns to its standby position and transmits a signal to the PLC, and the roller is clamped by the roll-coating gantry 31. There are a total of 8 rollers, each equipped with a sensor beneath the roller. The presence of rollers at 8 positions is determined using the sensors, and a clamping hand of the roll-coating gantry 31 executes a 180° rotation, rotating the roll-coating electric gripper 32 downward for roller clamping. Upon completion of the clamping operation, the roller coating process is initiated, with the number of coating cycles and positions being predefined within the system program during the debugging stage. Upon reaching the specified coating cycle number, the rollers are transferred to a roller unloading station using the clamping hand.

The unloading station is arranged at a lower portion of the roller rack 37, incorporating a set of through-beam sensors configured to detect roller placement status. Upon detection of roller placement, the roll-coating gantry 31 returns to its standby position, while the tray enters a UV curing zone for irradiation and curing. Upon completion of a preset curing duration, the tray is ejected from the UV curing zone, while the clamping hand of the roll-coating gantry 31 executes a 180° rotation, rotating the tray clamp hand downward to clamp the tray. Upon arrival at the unloading position of the roll-coating tray 36, laser ranging is performed to determine a height beneath, and height data is transmitted to the PLC for processing, thereby determining the tray position to execute the final unloading operation. Upon sequential completion of all above processes by each tray, the experiment concludes, with experimental data being automatically uploaded to the iPad.

Compared to the existing manual coating preparation and brush application processes, the present disclosure can utilize high-throughput technology to simultaneously complete the compounding of various coating formulations in large quantities, significantly reducing the labor and time costs associated with coating formulation screening. Through coordinated operation of robotic arms, processing steps such as coating application, transfer, and curing can be automatically, rapidly, and efficiently completed for various types and sizes of metal sheet materials. Through automated control, it can ensure the construction and processing of anticorrosion coatings on material surfaces, eliminating thickness variations caused by manual operations and expediting batch processing time.

For the specific application process:

Metal sheet materials of different sizes, either 20 mm×20 mm×3 mm or 10 mm×10 mm×3 mm in length, width, and height, undergo surface preparation by sandpaper grinding or chemical treatment to remove oxide layers and other contaminants. Furthermore, the metal sheet material requiring coating is grasped and transferred to an empty specimen tray position using the roll-coating robotic arm 5, and bottle caps are automatically removed using the reagent bottle uncapping robotic arm 6 by working in conjunction with the reagent bottle fixture and clamping station. Cooperating with the liquid handling robotic arm, multiple coating formulations with different compositions and ratios are automatically prepared in a single operation using high-throughput technology. Subsequently, the liquid handling robotic arm is utilized with servo pipette 42 to aspirate the required coating solution. Precise automated aspiration and dispensing are ensured by internal components of servo pipette 42, including a servo motor, a piston, and detection sensors, and the homogenized solution can be quantitatively aspirated and dispensed onto the specimen requiring coating. Following this, the coating application robotic arm retrieves a coating roller of the required dimensions from a coating roller fixture, thereby executing the coating application process onto the metal sheet surface.

The specimen is placed on a specimen tray with locating slots. Underneath the tray, locating pins are designed to match with the fixture at the UV irradiation station, ensuring precise tray locating. Therefore, the coated metal sheet material can be transferred from the dispensing position to the position under a UV lamp. Through PLC programming, combined with the touch screen, the UV irradiation times and wavelengths are programmed according to specific solution types, thereby completing the photocuring process of the anticorrosion coating. Once the irradiation time has elapsed, the tray is automatically retracted from the irradiation station, and the entire tray is transferred by the roll-coating electric gripper 32 of the roll-coating gantry 31 to a fixed storage position, where it is placed to wait further processing.

The high-throughput anticorrosion coating material automated preparation integrated platform includes an external framework and internal equipment, with overall dimensions (length×width×height) of 2240×1600×2230 mm. The external framework includes three glass sliding doors: one front, one rear, and one side door, all driven by electric cylinders. Moreover, two lower sliding doors adopt a split-opening mechanism, and the entire framework is supported by four Foma wheels for convenient overall relocation.

The internal equipment is equipped with the following components: liquid handling robotic arm, pipette assembly unit, pipette tip rack 43, waste pipette tip disposal port, reagent bottle uncapping robotic arm, reagent bottle clamping station, reagent bottle fixture, test tube solution mixing device, full specimen tray, empty specimen tray, coating application robotic arm, coating roller fixtures, waste brush roller disposal port, waste brush roller storage bin, cooling fans, and UV irradiation station.

The entire device is configured with nine stock solution bottles, each housed within a numbered fixture. Upon completion of experimental setup, the required types and respective volumes of stock solutions for this test run are automatically calculated by the system. Prompts are displayed on the touch screen indicating: the fixture position for each stock solution bottle. Operators place the stock solution bottles into the corresponding fixtures based on these instructions. For retrieval, the stock solution bottle gantry 11 is directed to the programmed position to retrieve the required bottle from its fixture, and the retrieved bottle is transferred to the uncapping station, completing uncapping. Following liquid aspiration, the caps are manually tightened. The stock solution bottle electric gripper 12 returns the bottles to the designated fixtures. The above reagent bottle fixture is designed to accommodate nine reagent bottles simultaneously, each with a diameter of φ57 mm and a height of 100 mm, while maintaining an approximate spacing of 90 mm between adjacent bottles, ensuring mutual independence among the reagent bottles.

The test tube solution mixing device measures 270 mm (length)×212 mm (width). Its bottom incorporates a test tube vortex mixer 44 to accelerate solution homogenization. The device can accommodate 40 test tubes simultaneously, each with dimensions of φ 18 mm×100 mm, thereby facilitating fully automated mixing of corrosion inhibitors and primer coats in coordination with the liquid handling robotic arm. Homogenization is achieved through an electric motor rotating an eccentric shaft, which drives the tray in an orbital motion. The shaking frequency is adjustable and achieved by varying rotational speed of the motor.

After homogenization is completed within the test tubes, the nine solution bottles are placed onto the stock solution bottle tray. The reagent bottle uncapping robotic arm grasps the reagent bottles. Following retrieval, each bottle is placed within a bottle body clamping device. After placement, the bottle body is clamped by clamping blocks. At this time, the bottle cap is clamped by the uncapping robotic arm 6, rotated counterclockwise, and lifted vertically, resulting in cap removal. The uncapping robotic arm 6 clamps the bottle cap and moves to another position, and the liquid handling robotic arm 4 performs the liquid aspiration. Upon completion, the cap is returned to the bottle using the uncapping robotic arm 6, rotated clockwise, and lowered to engage and tighten the cap. Following successful tightening, the bottle body clamping device is opened, and the stock solution bottle electric gripper 12 returns the solution bottle to its initial position. The uncapping operation is performed by the uncapping robotic arm 6, which clamps the bottle cap and rotates it counterclockwise. This uncapping robotic arm 6 is equipped with a floating mechanism 13, which can move in a Z-axis direction while rotating counterclockwise, thereby facilitating synchronized motion of counterclockwise rotation with upward displacement, or clockwise rotation with downward displacement. Furthermore, the solution bottle tray 14 position is stationary, and the bottle body clamping device is likewise fixed in place. Once teaching is completed, these positions remain unchanged. All pick-and-place locations are predefined during the initial teaching phase, programmed and stored. Both positions and programs are fixed and unalterable.

The reagent bottle uncapping robotic arm 6 is formed by the following components: Z-axis of the three-axis gantry, rotary gripper mounting plate, three-axis gantry X-axis support plate, three uncapping gantry guard plates, drag chain 16 bracket, linear module, drag chain 16, 120° C. flat-head rivet nut (M3×8.5), rotary gripper assembly unit, rotary gripper rail adapter plate, rotary gripper floating plate, guide rod mounting block, rail limit block, and spring retaining block. By adopting a gantry-style robotic arm constructed with the servo-controlled linear module, it operates in conjunction with the stock solution bottle electric gripper 12 to perform bottle grasping and uncapping operations. Simultaneously, two high-precision ball linear rails are mounted in the linear module to provide precise locating for both roll-coating robotic arm 5 and the reagent uncapping robotic arm. The drive mechanism employs a ball screw with preloaded lead screw nuts to ensure near-zero backlash during bidirectional movement. Power is provided by servo motors coupled with high-precision encoders. Structural components of the gantry robotic arm are made from welded steel and undergo precision machining on computerized numerical control (CNC) machine tool to guarantee manufacturing accuracy. Through comprehensive quality control and assembly protocols across these critical aspects, the gantry robotic arm can achieve a locating accuracy of ±0.1 mm.

The liquid handling robotic arm is equipped with a 5-channel pipette at its bottom, in which the pipette is formed by the following components: three pipette mounting plates, robot interface flange, pipette protective cover, hex socket head cap screws, standard elastic washers, hex socket button head screws, and cable carrier bracket. Each individual channel has a maximum aspiration volume of 5 mL, and five pipette tips can be accommodated under this pipette, with each pipette tip operating independently. A pipette tip fixture measures 320 mm (length)×200 mm (width) and accommodates 50 pipettes, each with a volume of 5 mL. Its internal structure includes the following components: pipette tip rack base plate, PIT placement plate, TIP rack side plate, pipette tip placement intermediate plate, hex socket head cap screws, and hex socket button head screws, thereby ensuring simultaneous aspiration of at least five distinct solutions in a single operation.

Quantitative liquid aspiration is achieved using the liquid robotic handling robotic arm through the servo pipette 42. This the servo pipette 42 is an automated liquid handling instrument compatible with robotic integration, facilitating precise aspiration and dispensing of predefined volumes. Its functions are achieved by an internal servo motor, piston mechanism, and detection sensors, ensuring accurate liquid aspiration and dispensing operations. Pipetting volume control is achieved by transmitting instructions from the iPad to the PLC control system. The PLC controls the servo motor within the pipette 42 to execute pipetting operations across variable volumes. Prior to operation, operators manually prepare and place solution bottles containing different solution types on the tray that accommodates up to nine bottles. Solution types corresponding to each tray position are configured using the iPad. Following setup completion, automated selection of distinct solution types is achieved.

To align with high-throughput principles and achieve diverse concentration gradients and solution variations of solution preparation, this enhanced pipette 42 retains the standard multi-solution aspiration capability of conventional single-row pipettes 42 while introducing a differentiated function from the single-row pipettes 42 that the leftmost pipette tip operates independently to perform aspiration from distinct solutions, repeated aspiration from identical solutions, and multi-tube dispensing functionality, significantly enhancing aspiration flexibility, maintaining operational efficiency while ensuring that coating solution formulations with gradient concentration variations of the same solution type can be selected even within the same row of test tubes, thereby fully embodying the design philosophy of high-throughput coating preparation.

The roll-coating tray 36 fixture tray measures 200 mm (length)×120 mm (width) and accommodates two sizes of specimens: 8 trays designed for 10 mm×10 mm specimens (each holding 20 specimens), and 8 trays designed for 20 mm×20 mm specimens (each holding 10 specimens).

The coating roller fixtures have dimensions of 100 mm (length)×51 mm (width), with a quantity of 2 fixtures in total. These fixtures provide a combined storage capacity of 8 coating rollers, each featuring an outer diameter of φ 19 mm.

The roll-coating electric gripper 32 is primarily formed by the following components: drag chain 16, linear module, 120° C. flat-head rivet nut (M3×8.5), guard linkage plate, coating gantry Y-axis mounting seat, gripper adapter mount, QR code distance measurement bracket, vertical drag chain 16 mounting plate, horizontal drag chain 16 mounting plate, Y-axis drag chain 16 mounting plate, coating gantry Z-axis mounting plate, coating Y-axis module mounting plate, coating gantry mounting plate, protective guard, drag chain 16 slot, laser displacement sensor mounting plate, and scanning camera 35. Similarly, two high-precision ball linear rails are mounted in the linear module to ensure structural rigidity throughout the moving part. The drive mechanism employs a ball screw with preloaded lead screw nuts to ensure near-zero backlash during bidirectional movement. Power is provided by servo motors coupled with high-precision encoders. Structural components of the gantry robotic arm are made from welded steel and undergo precision machining on CNC machine tool to guarantee manufacturing accuracy. Through comprehensive quality control and assembly protocols across these critical aspects, the roll-coating electric gripper 32 can achieve a locating accuracy of ±0.1 mm, thereby completing precise tray grasping, coating roller retrieval, and coating application operations. Coating rollers of various dimensions are arranged inside the coating roller fixtures, allowing operators to select the corresponding brush roller via iPad input commands based on the dimensions of the samples to be coated. The scanning camera 35 can scan the QR code on each carrier, recording sample status in the system program, such as coating application status and number of coating layers applied.

Conventional automated coating preparation equipment exhibits monolithic application methods, suitable only for fixed solution types with single operational scenario. To enhance the equipment's application scope and functional versatility, an autonomous robot monitoring and determination system has been integrated. This robot can autonomously determine homogenization conditions based on solution fluidity during mixing, and further dynamically select coating application methods from roller or drop coating by analyzing homogenization intensity and duration. This intelligent functionality can ensure superior coating uniformity while significantly broadening the equipment's operational range.

A coating process of the entire sample is as follows. Following liquid dispensing onto the specimen by the liquid handling robotic arm 4, the coating roller is removed from a coating roller rack by the roll-coating electric gripper 32. According to the preset position, the coating roller is pressed against the specimen, and moves along a predefined path to complete the coating application process. At the same time, the specimens are placed on the specimen trays with the locating slots. Underneath the trays, the locating pins are designed to match with the fixtures at the UV irradiation station, ensuring precise tray locating. Tray fixtures are mounted on servo-driven linear modules, which can achieve programmable stop position-setting to transfer the specimens from the dispensing positions to the UV irradiation zone.

The UV irradiation station measuring 150 mm (length)×100 mm (width) is designed to accommodate two types of samples for simultaneous irradiation: 25 pieces of 10 mm×10 mm specimens, and 10 pieces of 20 mm×20 mm specimens. UV irradiation parameters including exposure duration and wavelength are programmed via the PLC and the touch screen according to different coating formulation requirements, providing two UV irradiation wavelengths: 365 nm and 270 nm. The illumination intensity is continuously regulated through analog control, with a maximum intensity of 2000 mW/cm$^2$, sufficient to guarantee complete curing of coatings. Upon completion of the irradiation period and coating photocuring, the trays are automatically retracted from the irradiation station through the bottom locating pins, and the entire tray is transferred to a fixed position by the gantry robotic arm.

Within the equipment, the UV curing device can operate independently, serving not only to complete the photocuring process after coating application but also functioning as a dedicated or standalone apparatus for coating aging resistance testing through light source configuration adjustments. In conventional coating weathering resistance testing through natural aging, prohibitively long durations are required. Through this method, artificially accelerated weathering resistance testing is achieved, thereby granting the entire equipment an additional functionality beyond its primary purpose of coating preparation.

Five sets of servo pipettes 42 are placed on the liquid handling robotic arm. These pipettes 42 can precisely control aspiration and dispensing volumes, completing intelligent and accurate proportioning of solutions across different reagent bottles. Each pipette 42 features a maximum capacity of 5 mL with a volumetric accuracy of ±0.1 mL. Diverse coating solutions are rapidly and efficiently formulated using the high-throughput technology. The entire equipment can automatically construct and process anticorrosion coatings through automated control, eliminating human-induced errors and achieving large-scale automated production of coatings.

Upon determination by the robotic vision monitoring system that spray coating is required, the robot motion assembly 2 drives the high-throughput spraying mechanism 7 to execute precise solution deposition onto specimen carriers.

Figure 6:
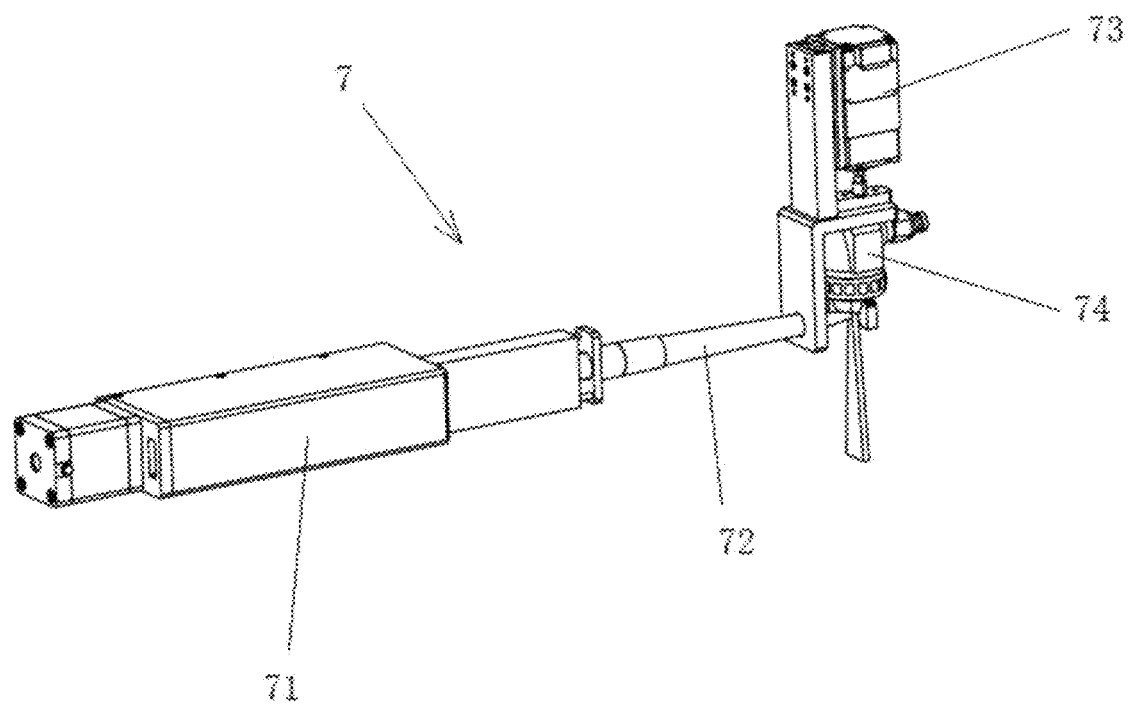
FIG. 6 is a schematic structural diagram of a high-throughput spraying mechanism.
Figure 7:
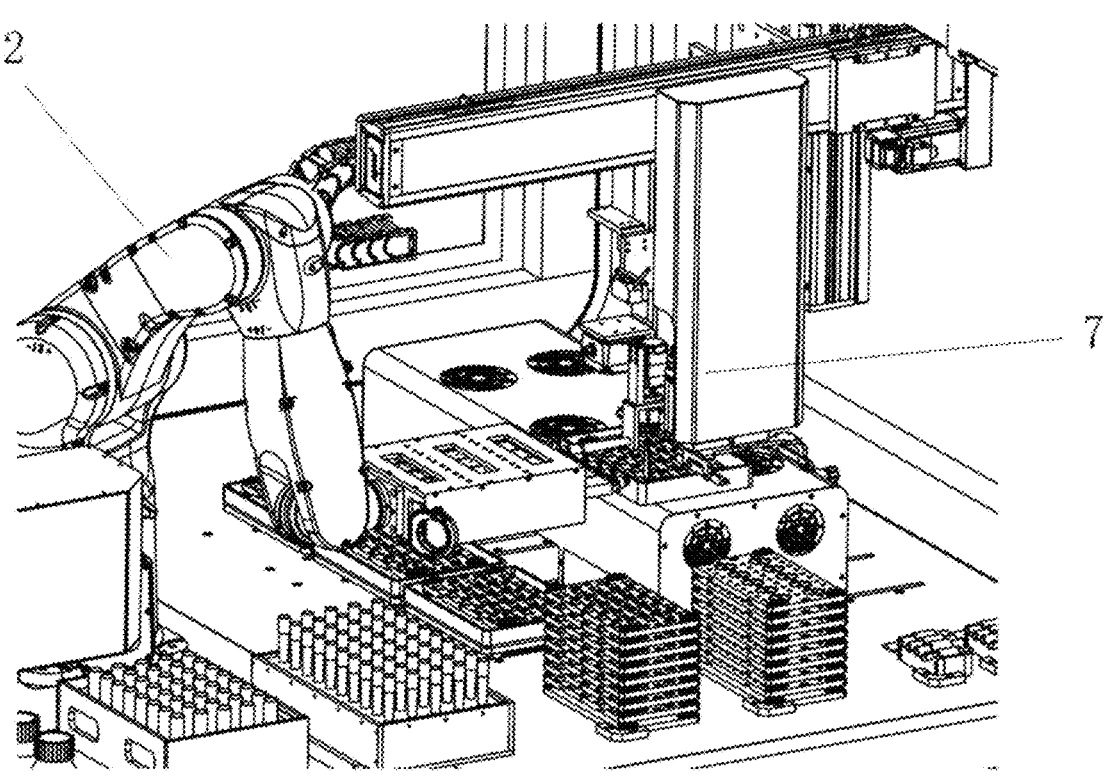
FIG. 7 is a schematic diagram showing a cooperative relationship between the high-throughput spraying mechanism and a robot motion assembly.

Specifically, referring to FIGS. 6-7, a high-throughput spraying mechanism 7 includes a quantitative conveying mechanism 71, a disposable needle tube 72, a spray-head lifting mechanism 73, and an atomizing nozzle 74.

The robot motion assembly 2 can drive the quantitative conveying mechanism 71 to mount the disposable needle tube 72, and aspirate liquids required for spray coating into the needle tube. Under driven by the robot motion assembly 2, the liquid-filled disposable needle tube 72 can be inserted into a spray-coating atomization zone of the spray-head lifting mechanism 73, and spray the liquids onto carrier surfaces in combination with the atomizing nozzle 74.

In the specific process, the robot motion assembly 2 drives the quantitative conveying mechanism 71 to mount one disposable needle tube 72, causing the needle tube to aspirate liquids required for spray coating in a solution preparation zone. Moreover, the liquid-filled disposable needle tube 72 is inserted into the spray-coating atomization zone of the spray-head lifting mechanism 73 through the robot.

Upon compressed air being admitted through the atomizing nozzle 74, and after the air pressure stabilizes, the liquid within the liquid-filled disposable needle tube 72 is slowly and uniformly extruded by the quantitative conveying mechanism 71, mixed and atomized with the air, and sprayed onto the carrier surface.

Furthermore, the movement of robot motion assembly 2 is coordinated with the spray-head lifting mechanism 73, causing the atomizing nozzle 74 to move across the carrier surface, thereby achieving complete surface coverage through uniform deposition of atomized liquid. Following spraying completion, the robot motion assembly 2 moves to the waste needle tube collection zone, where the used needle tube is automatically ejected.

The spray coating operation executed post-determination can achieve uniform coverage across surfaces of complex geometries, eliminating coating inconsistencies that may arise from manual brushing or roller application, making it particularly suitable for coating irregularly shaped objects or miniature samples requiring precision and uniformity.

Simultaneously, the spray coating operation offers straightforward operation and rapid processing speed, making it suitable for high-volume production and batch coating applications. Compared to conventional coating methods, spray application can typically enhance productivity and save time. From a coating application perspective, spray coating technology demonstrates strong applicability across diverse substrates with minimal surface preparation requirements, adapting effectively to diverse surfaces and coating requirements. During operation, coating thickness can be dynamically adjusted in real time to meet different functional demands. Furthermore, the spray coating technology can maximize material utilization efficiency, particularly in high-throughput automated spraying processes where material usage achieves significantly greater precision than manual application methods, thereby achieving higher transfer efficiency.

It is to be noted that the features within the embodiments of the present application may be combined without conflict.

The foregoing is only the preferred embodiment of the present application rather than limiting the present application. A person skilled in the art may make various modifications and adaptations to the present application. Any modifications, equivalent substitutions, or improvements made within the spirit and principles of the present application shall fall within the scope of protection of the present application.

The invention claimed is:

1. A method for preparing anticorrosion coatings, comprising the steps of:

treating surfaces of sample substrates to be coated by removing oxide layers, and placing the treated substrates on specimen fixture trays;

determining solution data based on types and composition ranges of corrosion inhibitors planned for anticorrosion coating preparation;

preparing solutions based on the solution data, adding the solutions to designated test tubes using an anticorrosion coating preparation platform, and thoroughly mixing with primer coats to obtain coating solutions;

dispensing the formulated coating solutions onto the surfaces of the sample substrates to be coated using a pipette, and applying coatings using a coating application robotic arm integrated in the anticorrosion coating preparation platform;

transferring the applied sample substrates to an ultraviolet (UV) radiation station, and performing irradiation by selecting different wavelengths and times corresponding to specific liquids to achieve thermal curing of anticorrosion coatings; and removing the specimen fixture trays from the UV radiation station upon completion of irradiation, and transferring the entire specimen fixture tray to a designated position using a gantry robotic arm, finalizing the preparation of the anticorrosion coatings;

the anticorrosion coating preparation platform comprising a stock solution bottle loading assembly, a robot motion assembly, a roll-coating gantry assembly, and a control assembly, wherein the robot motion assembly comprises a liquid handling robotic arm, a roll-coating robotic arm, an uncapping robotic arm, and a robotic vision monitoring system;

the robotic vision monitoring system is capable of determining the necessity of ion spraying surface treatment operations based on assessment of coating spreading behaviors across the surfaces of the sample substrates;

the liquid handling robotic arm comprises a clamp hand assembly, pipettes, a pipette tip rack, and a vortex mixer, and the pipette comprises a single-row pipette configuration capable of simultaneously aspirating distinct solutions; or alternatively, allowing independent aspiration of distinct solutions or identical solutions through peripheral channels within the single-row pipette;

the roll-coating robotic arm is capable of determining a coating application method from roller coating, drop coating, or spray coating under the control of the robotic vision monitoring system and the control assembly, based on solution fluidity characteristics; and the roll-coating gantry assembly comprises a roll-coating gantry, a roll-coating electric gripper, a hollow rotating platform, a laser displacement sensor, a camera, roll-coating trays, a roller rack, and UV curing assemblies, and the roll-coating gantry, the laser displacement sensor, the camera and the roll-coating electric gripper are electrically connected to the control assembly; and manual placement of roll-coating trays and rollers at fixed positions is performed, followed by moving the roll-coating gantry above a target tray; each roll-coating tray position is determined using the laser displacement sensor, and quick response (QR) code scanning is performed by the camera to register the roll-coating tray; after reagent dispensing by the liquid handling robotic arm, the rollers are clamped by the roll-coating gantry; the presence of rollers at a roll-coating station is determined using sensors, and roller coating is performed following roller clamping by the roll-coating electric gripper; and upon completion, the rollers are transferred to an unloading station.

2. The method for preparing anticorrosion coatings according to claim 1, wherein the control assembly is electrically connected to the robot motion assembly and the robotic vision monitoring system.

3. The method for preparing anticorrosion coatings according to claim 2, wherein the stock solution bottle loading assembly comprises a stock solution bottle gantry, a stock solution bottle electric gripper, a floating mechanism, a solution bottle tray, a locating block, a drag chain, and a clamping mechanism, an induction sensor is arranged at a lower portion of the solution bottle tray, photoelectric switches is correspondingly arranged on the stock solution bottle gantry, and the induction sensor and the photoelectric switches are electrically connected to the control assembly.

4. The method for preparing anticorrosion coatings according to claim 3, wherein upon manual placement of stock solution bottles onto the solution bottle tray, the placement of stock solution bottles is detected by the induction sensor, and each stock solution bottle is grasped by the stock solution bottle gantry and transferred to the clamping mechanism where it is clamped; after clamping, a bottle cap is rotated open by the stock solution bottle electric gripper, the bottle cap is retracted to a standby position through the stock solution bottle gantry, and a liquid aspiration signal is issued from the control assembly to the robot motion assembly for liquid aspiration; and upon completion, a signal is returned to the control assembly from the robot motion assembly, the bottle cap is re-tightened through the stock solution bottle gantry, and the stock solution bottle is released by the clamping mechanism and returned to its initial position.

5. The method for preparing anticorrosion coatings according to claim 2, wherein the clamp hand assembly, the pipette, the vortex mixer and the roll-coating gantry assembly are electrically connected to the control assembly.

6. The method for preparing anticorrosion coatings according to claim 5, wherein upon manual placement of pipette tips onto the pipette tip rack, the pipette tips are clamped by the clamp hand assembly for liquid aspiration using the pipette; and after liquid aspiration, the liquid handling robotic arm moves to the vortex mixer, and liquid dispensing is executed by the pipette into the test tubes, followed by the vortex mixer performing a shaking operation; and upon the completion of the shaking operation, the clamp hand assembly of the liquid handling robotic arm drives the pipette for liquid aspiration, while the roll-coating gantry assembly clamps the tray and places it on the roll-coating station; and upon completion of placement, the liquid handling robotic arm controls the pipette to perform quantitative dispensing operations, and contaminated tips are discarded after all reagents have been dispensed.

7. The method for preparing anticorrosion coatings according to claim 1, wherein the unloading station is arranged at a lower portion of the roller rack, through-beam sensors are arranged on the unloading station, and the through-beam sensors are electrically connected to the control assembly;

upon detection of the roller placed at the unloading station by the through-beam sensors, the roll-coating gantry is retracted to its initial position while the roll-coating tray is advanced into the UV curing assembly for irradiation; and after a predetermined irradiation time elapses, the roll-coating tray is ejected while the roll-coating tray is clamped by the roll-coating electric gripper, and the position of the roll-coating tray is determined by the laser displacement sensor, finalizing the unloading operation; and the UV curing assembly comprises a UV lamp, and the UV lamp is electrically connected to the control assembly.

8. The method for preparing anticorrosion coatings according to claim 1, wherein the preparation platform further comprises a spraying mechanism, the spraying mechanism comprises a quantitative conveying mechanism, a disposable needle tube, a spray-head lifting mechanism, and an atomizing nozzle; and the robot motion assembly is capable of driving the quantitative conveying mechanism to mount the disposable needle tube, and aspirating liquids for spray coating into the needle tube; and the liquid-filled disposable needle tube is capable of being inserted into a spray-coating atomization zone of the spray-head lifting mechanism under driven by the robot motion assembly, and spraying the liquids onto carrier surfaces in combination with the atomizing nozzle.

* * * * *